(12) United States Patent
Reimer

(10) Patent No.: US 10,704,949 B2
(45) Date of Patent: Jul. 7, 2020

(54) FLUID LEVEL SENSING UTILIZING RING-TIME SIGNATURES OF A TRANSDUCER

(71) Applicant: SSI Technologies, LLC, Janesville, WI (US)

(72) Inventor: Lawrence B. Reimer, Georgetown, SC (US)

(73) Assignee: SSI Technologies, LLC, Janesville, WI (US)

( * ) Notice: Subject to any disclaimer, the term of this patent is extended or adjusted under 35 U.S.C. 154(b) by 152 days.

(21) Appl. No.: 15/895,328

(22) Filed: Feb. 13, 2018

(65) Prior Publication Data
US 2019/0250024 A1 Aug. 15, 2019

(51) Int. Cl.
*G01F 23/296* (2006.01)
(52) U.S. Cl.
CPC ...... *G01F 23/2961* (2013.01); *G01F 23/2962* (2013.01); *G01F 23/2965* (2013.01); *G01F 23/2968* (2013.01)
(58) Field of Classification Search
CPC ............. G01F 23/2961; G01F 23/2965; G01F 23/2962
See application file for complete search history.

(56) References Cited

U.S. PATENT DOCUMENTS

| 5,730,025 A | 3/1998 | Getman et al. |
| 6,142,015 A * | 11/2000 | Getman ............... G01F 23/2961 340/621 |
| 6,573,732 B1 | 6/2003 | Reimer |
| 7,246,522 B1 * | 7/2007 | Diaz ...................... G01N 29/07 73/52 |
| 2010/0126267 A1 | 5/2010 | Agam et al. |
| 2017/0123055 A1 * | 5/2017 | Hustava ................ G01S 15/931 |

FOREIGN PATENT DOCUMENTS

GB 2498952 A 8/2013

OTHER PUBLICATIONS

International Search Report and Written Opinion for Application No. PCT/US2019/013432 dated Apr. 23, 2019 (12 pages).

* cited by examiner

*Primary Examiner* — Paul M. West
(74) *Attorney, Agent, or Firm* — Michael Best & Friedrich LLP

(57) ABSTRACT

A level measurement system including a tank, a transducer, and a controller. The tank is configured to contain a liquid. The transducer is configured to output an ultrasonic signal into the tank. The controller has a memory and electronic processor. The controller is electrically coupled to the transducer and is configured to determine a ring time of the transducer, and determine a level of the liquid contained within the tank based on the ring time of the transducer.

16 Claims, 4 Drawing Sheets

FLUID LEVEL SENSING UTILIZING RING-TIME SIGNATURES OF A TRANSDUCER

FIELD

Embodiments relate to fluid measurement systems and methods of operating the same.

SUMMARY

Fluid measurement systems measure the level of a fluid (for example, a liquid) contained within a container, for example, a tank. Some measurement systems include ultrasonic transducers and rely on ultrasonic measurement techniques. In some instances, ultrasonic sensing systems also include a float. In such a system, the ultrasonic transducer outputs an ultrasonic signal towards the float located on a surface of the liquid contained within the tank. Other level measurement systems may include other mechanical or magnetic switches to determine a level of the liquid contained within the tank. However, such systems may fail over time as a result of relying on moving parts.

Thus, one embodiment provides a level measurement system including a tank, a transducer, and a controller. The tank is configured to contain a liquid. The transducer is configured to output an ultrasonic signal into the tank. The controller has a memory and electronic processor. The controller is electrically coupled to the transducer and is configured to determine a ring time of the transducer, and determine a level of the liquid contained within the tank based on the ring time of the transducer.

Another embodiment provides a method of determining a level of a fluid in a tank. The method includes activating, via a controller, a transducer, and determining a ring time of the transducer. The method further includes determining, based on the ring time, the level of the fluid in the tank, and outputting, via the controller, the level of the fluid in the tank.

Other aspects of the application will become apparent by consideration of the detailed description and accompanying drawings.

DETAILED DESCRIPTION

Before any embodiments are explained in detail, it is to be understood that they are not limited in their application to the details of construction and the arrangement of components set forth in the following description or illustrated in the following drawings. Other embodiments are possible and the embodiments described are capable of being practiced or of being carried out in various ways.

Figure 1A:
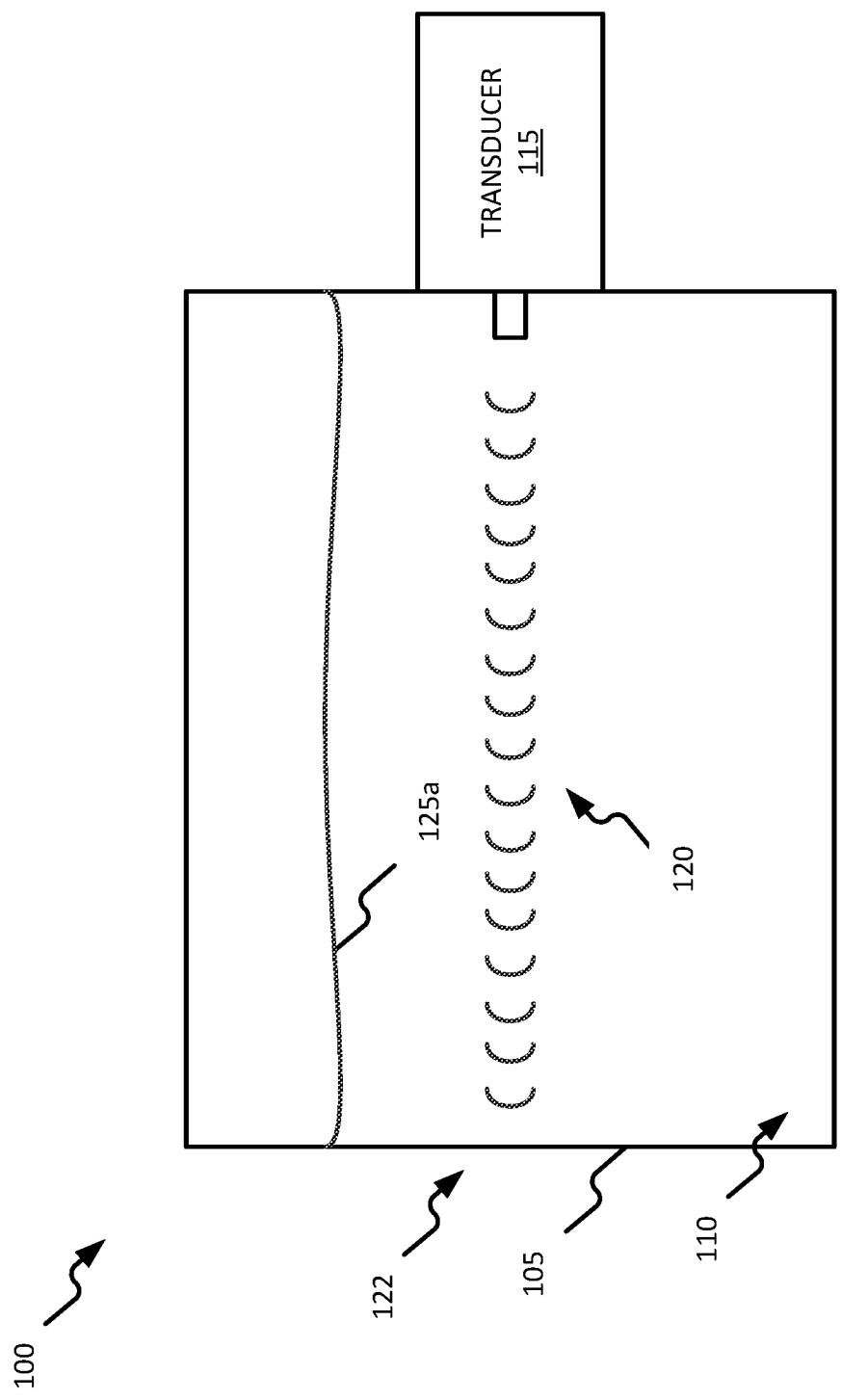
FIG. 1A illustrates a system configured to determine a level of a fluid in a liquid-coupled state.
Figure 1B:
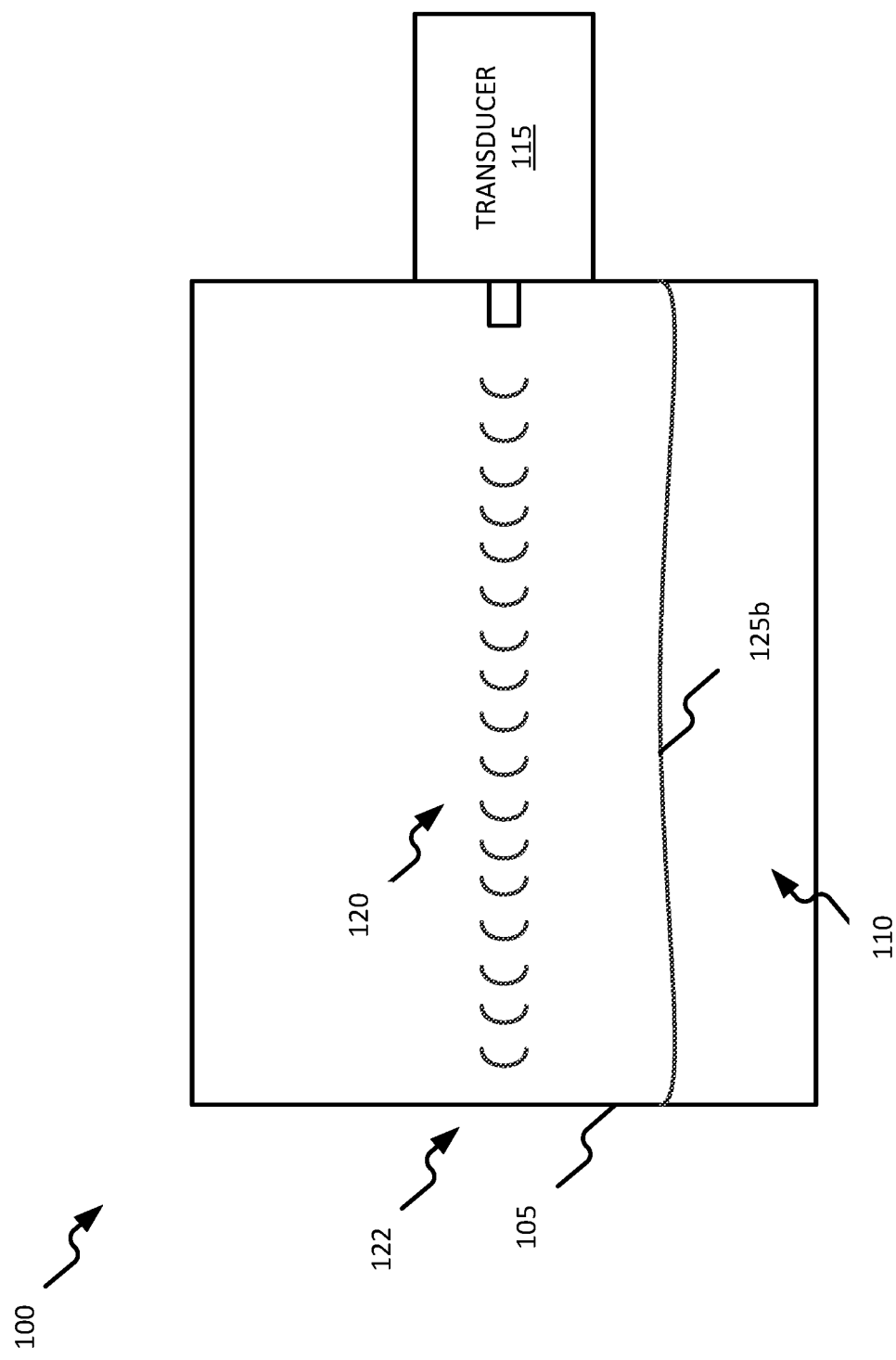
FIG. 1B illustrates the system of FIG. 1A in an air-coupled state.

FIGS. 1A and 1B are block diagrams of a system 100 according to some embodiments. The system 100 includes a tank 105 configured to contain a fluid 110. In some embodiments, the fluid 110 is a liquid, such as but not limited to, hydraulic fluid, diesel exhaust fluid (DEF), brake fluid, oil, fuel, transmission fluid, washer fluid, power steering fluid, and refrigerant.

The system 100 further includes a transducer 115. The transducer 115 acts as both a transmitter and a receiver. In some embodiments, transducer 115 is an ultrasonic transducer (for example, a piezoelectric ultrasonic transducer (PZT)). Although illustrated as partially outside of tank 105, in some embodiments, the transducer 115 is located completely outside of the 105. In yet other embodiments, the transducer 115 is located completely within the tank 105.

The transducer 115 is configured to output a sound wave 120 into the tank 105. In the illustrated embodiment, the sound wave 120 is output toward a side wall 122 of the tank 105. The sound wave 120 is then reflected off of the side wall 122 and an echo of the sound wave 120 travels back to the transducer 115. Although illustrated as being located at the middle of the tank 105, in other embodiments, the transducer 115 may be located proximate the top or bottom of the tank 105.

The fluid 110 includes a surface 125 (which in FIG. 1A is illustrated as surface 125a and in FIG. 1B is illustrated as surface 125b). The amount of fluid in the tank 105 may be such that the surface 125a is above transducer 115. When the surface level 125a is above transducer 115, the sound wave 120 travels through the fluid 110 and the transducer 115 is considered to be "liquid coupled" to the fluid 110. When liquid coupled, the transducer 115 (having dimensions of X and Y) has a first ring time. In some embodiments, the transducer 115 may have a diameter of approximately 14 mm and a thickness of approximately 1 mm. In some embodiments, the first ring time is approximately 1 ms to approximately 3 ms (for example, approximately 2 ms). In other embodiments, the first ring time is less than approximately 20 µs.

As illustrated in FIG. 1B, the amount of fluid in the tank 105 may be such that surface level 125b is below the transducer 115. When the surface level 125b is below the transducer 115, the sound wave 120 does not travel through the fluid 110 and the transducer 115 is considered to be "air coupled" to the fluid 110, because the sound wave 120 travels through air. When sound wave 120 travels through air, transducer 115 (having the same dimensions of X and Y) has a second ring time. In some embodiments, the second ring time is approximately double the first ring time. For example, in some embodiments, the second ring time is approximately 3 ms or more. In other embodiments, the second ring time is greater than approximately 40 µs.

Figure 2:
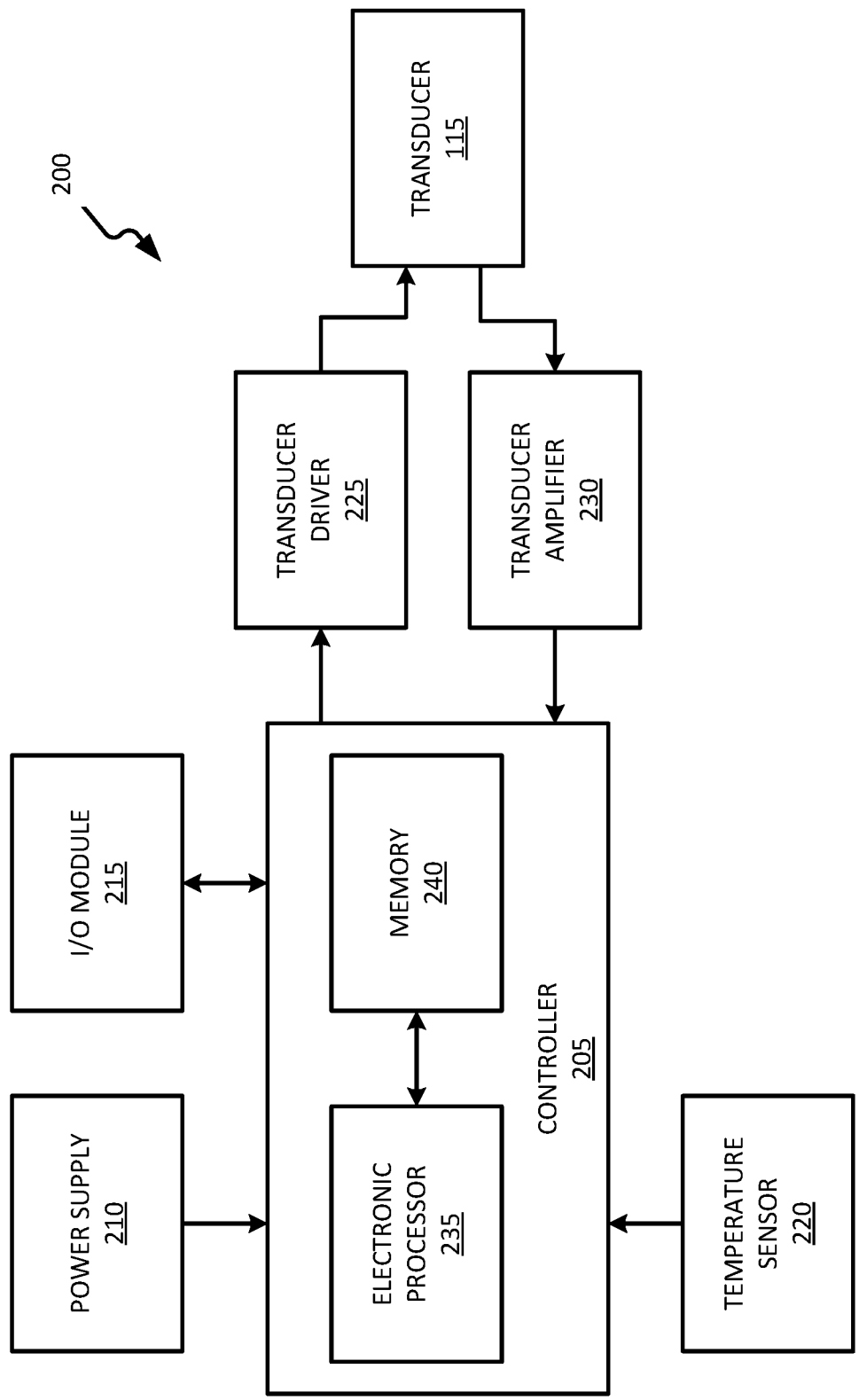
FIG. 2 is a block diagram of a control system fluid level measurement system of FIGS. 1A and 1B according to some embodiments.

FIG. 2 is a block diagram of a control system 200 of the system 100 according to some embodiments. The control system 200 includes a controller 205. The controller 205 is electrically and/or communicatively connected to a variety of modules or components of the system 100. For example, the controller 205 is electrically and/or communicatively connected to the transducer 115, a power supply 210, an input/output (I/O) interface 215, and a temperature sensor 220.

In the illustrated embodiment, the controller 205 is electrically and/or communicatively connected to the transducer 115 via a transducer driver 225 and a transducer amplifier 230. The transducer driver 225 generates a voltage impulse used to drive the transducer 115 into resonance. The transducer amplifier 230 amplifies and squares an electrical signal from the transducer 115 and outputs the amplified and squared electrical signal (for example, a square wave) to the controller 205. In some embodiments, the transducer driver 225 and the transducer amplifier 230 may be partially, or completely, embedded into the transducer 115 along with piezoelectric material. In other embodiments, the transducer driver 225 and the transducer amplifier 230 may be located separately from the piezoelectric material of transducer 115.

In some embodiments, the controller 205 includes a plurality of electrical and electronic components that provide power, operational control, and protection to the components and modules within the controller 205 and/or the system 100. For example, the controller 205 includes, among other things, an electronic processor 235 (for example, a microprocessor or another suitable programmable device) and the memory 240.

The memory 240 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 235 is communicatively coupled to the memory 240 and executes software instructions that are stored in the memory 240, or stored on another non-transitory computer readable medium such as another memory or a disc. The software may include one or more applications, program data, filters, rules, one or more program modules, and other executable instructions.

Power supply 210 is configured to supply nominal power to the controller 205 and/or other components of the system 100. In some embodiments, power supply 210 receives power from an external source (for example, a vehicle power bus). In other embodiments, the power supply 210 receives power from other power sources, for example a battery.

The I/O interface 215 provides an interface between system 100 and external devices (for example, a vehicle network bus). Depending on the particular application, the I/O interface 215 may support wired communications, wireless communications, or both.

Temperature sensor 220 is configured to measure a temperature of the fluid 110 and output a temperature signal, indicative of the temperature of the fluid 110, to the controller 205. Sensors suitable for use as the temperature sensor 220 include thermocouples, thermistors resistive temperature sensor, and infrared temperature sensors.

In operation, the controller 205 controls the transducer driver 225 to generate a voltage impulse used to drive the transducer 115 into resonance and output soundwave 120. The transducer amplifier 230 amplifies and squares an electrical signal from the transducer 115 and outputs the amplified and squared electrical signal to the controller 205. Controller 205 receives the signal from the transducer amplifier 230 and determines a ring time of the transducer 115 based on the signal. Based on the ring time of the transducer 115, the controller 205 determines whether the transducer 115 is liquid coupled or air coupled. For example, if the ring time of the transducer 115 is below a respective ring time threshold, the controller 205 determines that the transducer 115 is liquid coupled, and if the ring time of the transducer 115 is above the respective ring time threshold, the controller 205 determines that the transducer 115 is air coupled. Based on the transducer 115 being liquid coupled or air coupled, the controller 205 may then determine whether the surface level 125 is above, approximately equivalent to, or below the transducer 115.

A temperature of fluid 110, and/or temperature of the transducer 115, may affect the ring time of the transducer 115. In some embodiments, controller 205 compensates for the effect of temperature on these characteristics. The controller 205 receives a temperature of the fluid 110 from temperature sensor 220. The controller 205 then determines the ring time threshold based on the received temperature.

Figure 3:
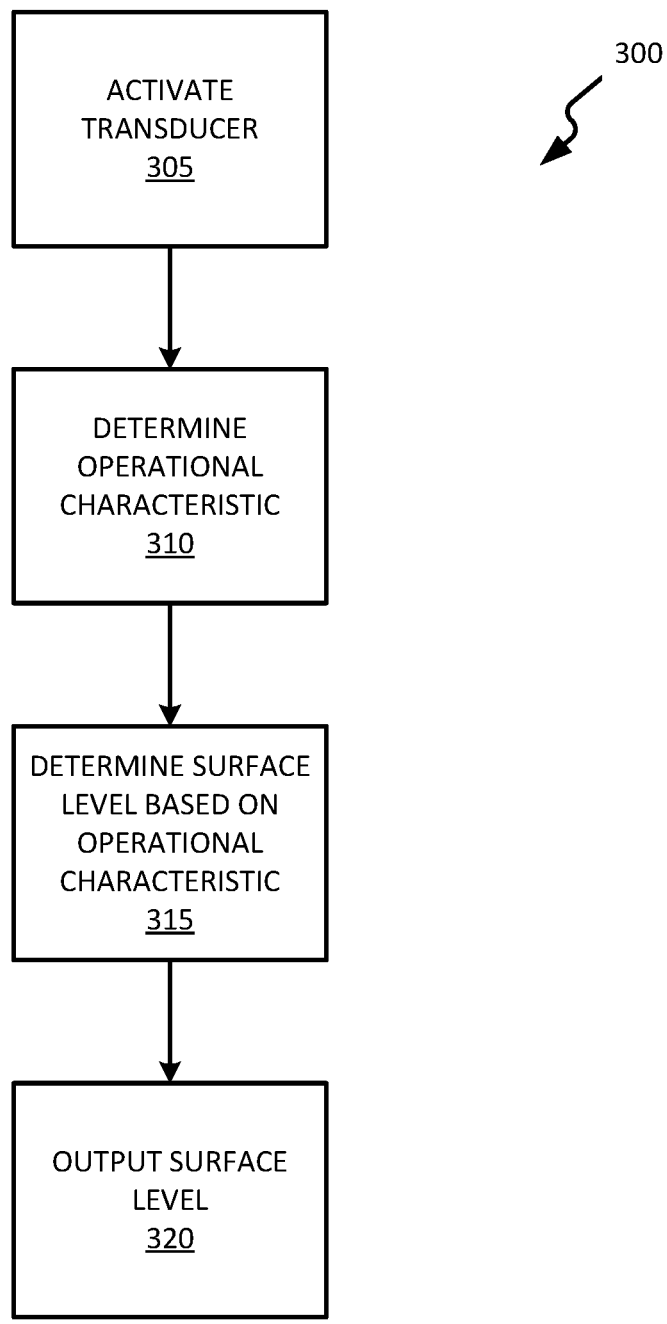
FIG. 3 is a flowchart illustrating a method or process of the system of FIGS. 1A and 1B according to some embodiments.

FIG. 3 is a flowchart illustrating a process, or operation, 300 of the system 100 according to some embodiments. It should be understood that the order of the steps disclosed in process 300 could vary. In addition, other steps may be added and not all of the steps may be required. Initially, the transducer 115 is activated (block 305). Once the transducer 115 is activated, an operational characteristic of the transducer 115 is determined (block 310). In some embodiments, the operational characteristic of the transducer 115 is a ring time. The controller 205 determines, based on the operational characteristic of the transducer 115, whether the surface level 125 is above or below the transducer 115 (as illustrated in FIG. 1A) (block 315). In some embodiments, the controller 205 determines whether the surface level 125 is above or below the transducer 115 based on a comparison between the operational characteristic and a threshold (for example, a ring time threshold). The controller 205 then outputs an indication based on whether the surface level 125 is above or below the transducer 115 (block 320).

Thus, embodiments provide, among other things, a system and method for determining a level of a fluid. Various features and advantages of the application are set forth in the following claims.

What is claimed is:

1. A level measurement system comprising:
a tank configured to contain a liquid having a surface level;
a transducer positioned at a predetermined position on a first sidewall of the tank, the transducer configured to output an ultrasonic signal into toward a second sidewall of the tank; and
a controller having a memory and electronic processor, the controller electrically coupled to the transducer, the controller configured to
determine a ring time of the transducer,
determine, based on the ring time of the transducer, when the transducer is in an air-coupled state,
determine the surface level of the fluid to be below the predetermined position when the transducer is in the air-coupled state,
determine, based on the ring time of the transducer, when the transducer is in a liquid-coupled state, and
determine the surface level of the fluid to be above the predetermined position when the transducer is in the liquid-coupled state.

2. The level measurement system of claim 1, wherein the transducer is in the liquid-coupled state the ring time is below a ring time threshold.

3. The level measurement system of claim 1, wherein the transducer is in the air-coupled state when the ring time is above a ring time threshold.

4. The level measurement system of claim 1, wherein the controller is further configured to determine a ring time threshold.

5. The level measurement system of claim 4, wherein the ring time threshold is based on a temperature of the liquid contained within the tank.

6. The level measurement system of claim 1, wherein the controller is further configured to output the surface level of the liquid contained within the tank.

7. The level measurement system of claim 1, wherein transducer has a first ring time when in the liquid-coupled state and a second ring time when in the air-coupled state.

8. The level measurement system of claim 7, wherein the second ring time is approximately double the first ring time.

9. A method of determining a level of a fluid in a tank, the method comprising:
- providing a transducer at a predetermined position on a sidewall of the tank;
- activating, via a controller, the transducer;
- determining a ring time of the transducer;
- determining, based on the ring time of the transducer, whether the transducer is in an air-coupled state or a liquid-coupled state;
- determining the level of the fluid to be below the predetermined position when the transducer is in the air-coupled state;
- determining the level of the fluid to be above the predetermined position when the transducer is in the liquid-coupled state, and
- outputting, via the controller, the level of the fluid in the tank.

10. The level measurement system of claim 9, wherein the transducer is liquid coupled when the ring time is below a ring time threshold.

11. The level measurement system of claim 9, wherein the transducer is air coupled when the ring time is above a ring time threshold.

12. The level measurement system of claim 9, wherein the controller is further configured to determine a ring time threshold.

13. The level measurement system of claim 12, wherein the ring time threshold is based on the temperature of the fluid within the tank.

14. The level measurement system of claim 9, wherein the controller is further configured to output the level of the liquid contained within the tank.

15. The level measurement system of claim 9, wherein transducer has a first ring time when liquid coupled and a second ring time when air coupled.

16. The level measurement system of claim 15, wherein the second ring time is approximately double the first ring time.

* * * * *